Sept. 24, 1968 L. HERRMANN 3,402,701
ROTATING CYLINDRICAL FURNACE WITH WASTE HEAT UTILIZATION
FOR PERFORMING EXOTHERMIC PROCESSES
Filed June 13, 1966 3 Sheets-Sheet 1

INVENTOR
Ludwig Herrmann
BY Curtis, Morris & Safford
ATTORNEYS

United States Patent Office 3,402,701
Patented Sept. 24, 1968

3,402,701
ROTATING CYLINDRICAL FURNACE WITH WASTE HEAT UTILIZATION FOR PERFORMING EXOTHERMIC PROCESSES
Ludwig Herrmann, Hofheim, Taunus, Germany, assignor to Farbwerke Hoechst Aktiengesellschaft vormals Meister Lucius & Brüning, Frankfurt am Main, Germany, a corporation of Germany
Filed June 13, 1966, Ser. No. 557,210
Claims priority, application Germany, June 24, 1965, F 46,424
5 Claims. (Cl. 122—11)

ABSTRACT OF THE DISCLOSURE

A rotatable cylindrical furnace for burning refuse and conducting exothermic reactions generally in which the interior cylindrical wall is constructed of tubes of a heat-conductive material such as metal and water or other cooling fluid is circulated through the tubes to absorb the heat generated in the furnace and utilize said heat to convert the water into steam.

---

The present invention relates to a rotating cylindrical furnace with waste heat utilization for performing exothermic processes, particularly for burning industry and house refuse or for carrying out chemical processes.

For refuse incineration there have been used plants comprising a rotating cylindrical furnace which is preceded or followed by a furnace provided with a travelling or swinging grate. The hot waste gases are utilized in series-connected heat exchangers for steam generation.

The rotating cylindrical furnaces hitherto used in such plants consist of a shell provided with a refractory lining. This type of apparatus can be used in cases in which the combustibles do not vary greatly as regards the chemical composition of the products of combustion and the calorific value. Problems arise, however, if these factors vary strongly.

If the calorific value varies, the lining is locally overheated by sudden temperature peaks. Owing to thermal expansion associated therewith and subsequent cooling, the lining is subjected to strong mechanical stress and finally cracks or comes off.

The lining cannot be adjusted to products of combustion of varying composition. It must be designed either for acid or alkaline products. Linings resistant to acid are destroyed by alkaline products of combustion and vice versa.

Repairs to lined rotating cylindrical furnaces are time-consuming and expensive. The whole plant must be shut down and cooled, which takes a rather long time because of the high thermal capacity of the lining. The plant can be started again only after a prolonged delay after repairing and only with gradually increasing load.

Now I have found that the above disadvantages of the constructions hitherto used can be avoided by using a rotating cylindrical furnace with waste heat utilization for performing exothermic processes, particularly for burning industrial and house refuse, which rotating cylindrical furnace is constructed, in accordance with the invention, as a boiler.

The boiler is advantageously operated as a forced circulation boiler.

For this purpose, the rotating cylindrical furnace may consist, for example, of a shell of boiler sheet metal which is provided with heating pipes.

In a particularly advantageous mode of construction, the rotating cylindrical furnace is formed by pipes which are each provided with two longitudinal fins at which they are welded to one another. In this case, a supporting shell may be dispensed with. To prevent heat losses due to radiation and dissipation to the outside, the rotating cylindrical furnace may be surrounded with a light casing of sheet metal and the space between the rotating cylinder and the casing may be filled with a heat-insulating filler, for example mineral wool.

To ensure that the combustibles introduced into the furnace are burned completely, the rotating cylindrical furnace is advantageously provided in several places with nozzles for the additional introduction of air or fuel from outside.

In many cases it may be advantageous or necessary to provide one or more ignition zones with heat-insulating material. For this purpose it is advantageous to use a chemically resistant refractory tamping compound, for example of silicon carbide, which is preferably fastened to the wall of the furnace by pins welded to the said furnace wall.

The rotating cylindrical furnace of the invention is applicable to processes with greatly varying thermal load. In particular, it enables refuse of varying composition as regards the calorific value and the chemical nature of the products of combustion to be burned.

In the rotating cylindrical furnace of the invention, temperature peaks due to variations of the calorific value cannot give rise to local overheating since the heat is continuously removed by circulating water and distributed by the relatively high heat conductivity of the furnace wall. Moreover, temperature peaks can be compensated, if necessary, by increasing for a short time the amount of water circulating.

The rotating cylindrical furnace designed as a boiler in accordance with the invention need not be provided with a lining. The chemical composition of the products of combustion is therefore only of minor importance since the temperature of the furnace wall is determined by the vaporization temperature of the circulating water under the working pressure. Under a working pressure of, for example, 14 atmospheres gage, the vaporization temperature of the circulating water is about 200° C. By an appropriate choice of the material for the furnace wall, damages to the said furnace wall caused by products of combustion can be prevented in a reliable manner at the said temperature.

Any damages which may nevertheless occur, for example tube bursts, are considerably easier to repair in the rotating cylindrical furnace of the invention than in lined rotating cylindrical furnaces. The damaged section of the respective tube is cut out and replaced by a corresponding new one. Also, the time for which a furnace under repair is necessarily out of operation is shorter with the rotating cylindrical furnace of the invention than with lined rotating cylindrical furnaces since, besides a simpler and therefore time-saving repair, cooling down and starting the furnace again requires less time.

The invention will now be described by way of example only, with reference to the accompanying drawings in which.

Figure 1:
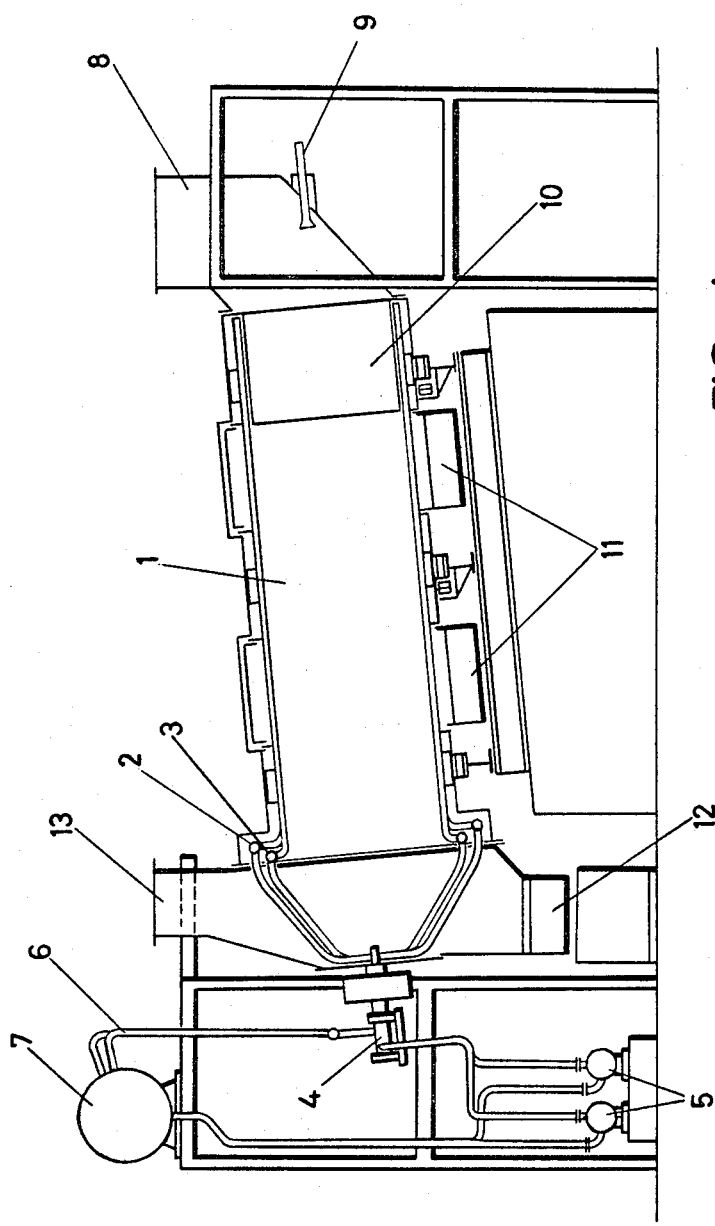
FIG. 1 is a diagrammatic view of the arrangement of a rotating cylindrical furnace in accordance with the invention in an incineration plant for industry refuse.

The rotating cylindrical furnace 1 (FIG. 1) consists of pipes which are each provided with two longitudinal fins at which they are welded to one another. The feed water is conveyed by circulation pump 5 via stuffing box 4 into ring circuit 2 from where it flows through the heating pipes forming the shell of the furnace. The feed water flows back to return ring circuit 3 and through stuffing box 4 and pipe 6 into boiler drum 7. The combustibles are introduced into charging hopper 8. An ignition burner is represented at 9. At the inlet of the furnace, ignition zone 10 is disposed, the position and dimensions of which must be adjusted to the combustibles. At 11, air reservoirs are disposed, which are fitted like rings around the rotating cylindrical furnace and from which additional air of combustion may be blown in through nozzles disposed between the fins of the heating pipes. The ashes are removed at 12. Instead of removing the ashes directly, a travelling, swinging or tipping grate for afterburning may be disposed, if desired. In outlet opening 13 for the flue gas, afterheating surfaces for the superheating of steam or preheating of feed water may be arranged.

Figure 3:
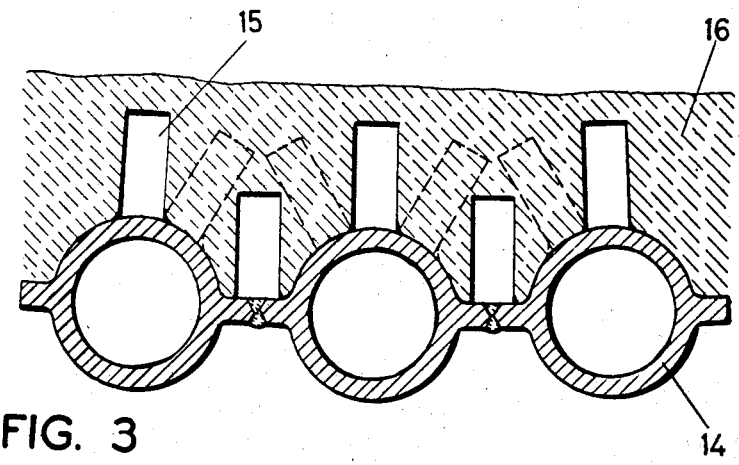
FIG. 3 is a cross-section through a part of the furnace wall in the ignition zone.
Figure 2:
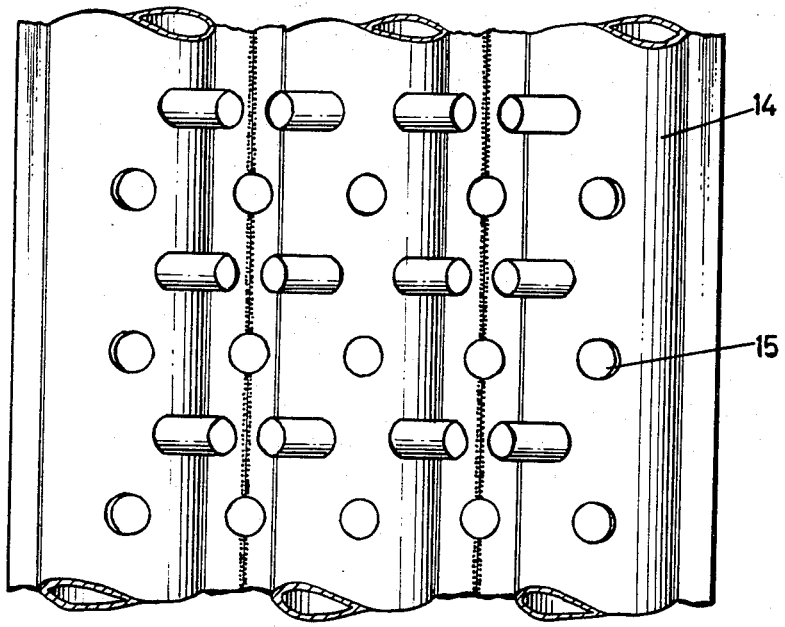
FIG. 2 is a view of a part of the inside of the furnace wall in the ignition zone before the application of tamping compound.

FIGS. 2 and 3 show an advantageous form of designing the ignition zone 10. To fasten heat-insulating material 16, which advantageously consists of a tamping compound, pipes 14 themselves as well as their fins are provided with pins 15 by welding.

Figure 4:
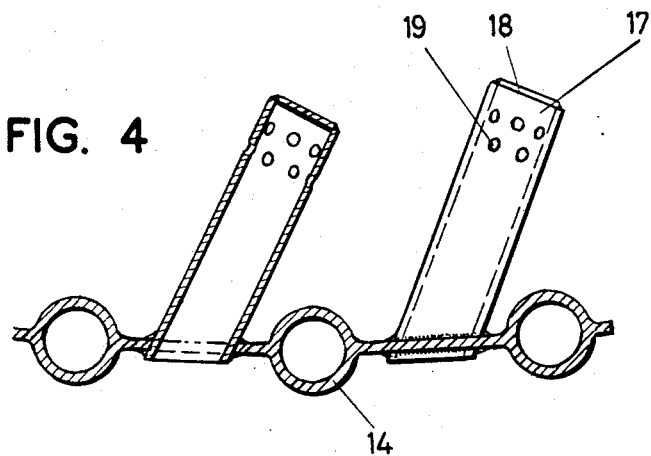
FIG. 4 is a cross-section through the furnace wall with nozzle pipes for blowing in additional air.
Figure 5:
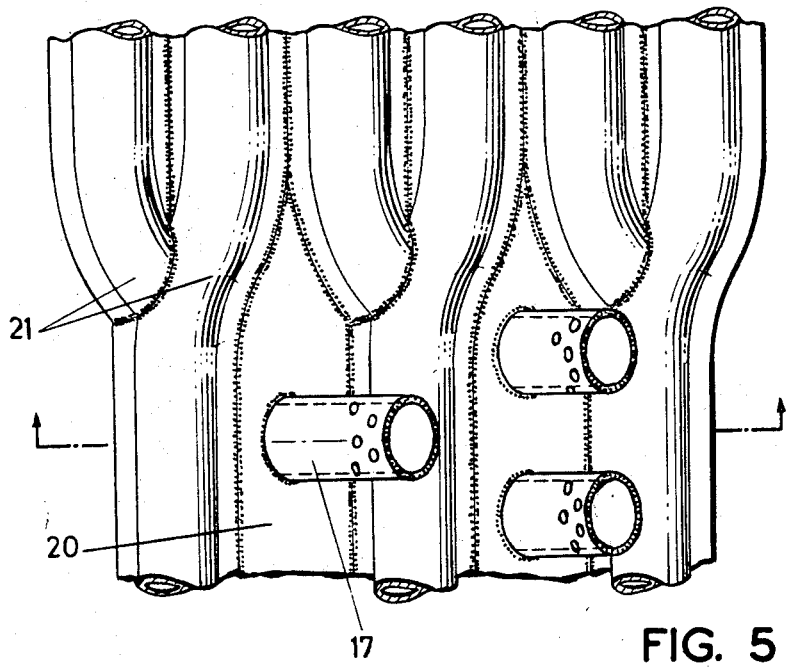
FIG. 5 is a plan view of a part of the furnace wall with nozzle pipes for blowing in additional air.

FIGS. 4 and 5 show a mode of inserting the nozzles for additional air of combustion in the zone of air reservoirs 11. Nozzles 17 advantageously consist of short pipes to which lids 18 have been welded and which are furthermore provided with lateral bores 19. Lids 18 prevent combustibles from falling into the nozzles and obstructing them. Nozzles 17 are advantageously inserted in enlarged fins 20. To render possible the enlargement of the fins, the heating pipes are united in the form of a fork as shown at 21 before and after the sections of the rotating cylindrical furnace that are provided with nozzles for additional air.

The rotating cylindrical furnace of the invention is not only applicable to refuse incineration. It may also be used for chemical reactions, for example the manufacture of calcium cyanamide from calcium carbide and nitrogen. As is known, the heat of reaction is removed in this reaction by cooling the circulating nitrogen. In accordance with the invention, the heat of reaction can be removed directly at the site of formation after the reaction has been started. With the help of the insulated ignition zones in the rotating cylindrical furnace, the reaction is initiated in these zones and the reaction temperature can be kept in the further course of the reaction with the help of the cooling pipes provided with two longitudinal fins at such a value that the material to be reacted does not cake. Since the nitrogen is only used for the reaction and not for cooling, it need only be introduced in the amount and rate required for the reaction so that dust formation during the reaction is considerably reduced and only a small amount of dust is entrained from the furnace by the reaction gases.

I claim:
1. A rotatable cylindrical furnace for performing exothermic processes, said furnace having a cylindrical wall of longitudinal tubes exposed to the interior of the furnace, said tubes being interconnected along their full extent to form a solid enclosure, and means for circulating a cooling fluid to, through and from said tubes for absorbing heat generated within the furnace.

2. A rotatable cylindrical furnace as defined in claim 1 wherein each said tube includes a lateral finned extension, each said fin abutting the fin of the next adjacent tube with said abutting fins being welded to one another.

3. A rotatable cylindrical furnace as defined in claim 1 wherein a portion of said cylindrical furnace is provided with nozzles extending into said furnace for introducing air of combustion or fuel.

4. A rotatable cylindrical furnace as defined in claim 1 including an ignition zone at one end of the cylindrical furnace formed by a heat-insulating material adhering to the tube surfaces facing the interior of the furnace.

5. A rotatable cylindrical furnace as defined in claim 4 wherein the tube surfaces facing the interior of the furnace are provided with projections to facilitate adhesion of the heat-insulating material to the tube surfaces.

References Cited
UNITED STATES PATENTS

| | | | |
|---|---|---|---|
| 241,515 | 5/1881 | Siemens | 165—88 |
| 1,005,396 | 10/1911 | Wolle | 165—88 |
| 1,081,063 | 12/1913 | Ross | 165—88 |
| 2,293,735 | 8/1942 | Hardgrove | 122—6 |
| 3,034,776 | 5/1962 | Hennenberger et al. | 263—33 |
| 518,285 | 4/1894 | Storer | 122—2 |
| 1,708,526 | 4/1929 | Tocco et al. | 122—6 X |
| 2,484,161 | 10/1949 | Fulton | 122—11 |
| 2,660,155 | 11/1953 | Chapman | 122—6 |
| 3,139,866 | 7/1964 | Lumm et al. | 122—6 |
| 3,306,237 | 2/1967 | Ransom | 110—14 |

KENNETH W. SPRAGUE, *Primary Examiner.*